United States Patent
Stauffer et al.

(10) Patent No.: US 9,855,926 B2
(45) Date of Patent: Jan. 2, 2018

(54) SYSTEMS AND METHODS FOR PROMOTING CLEANLINESS OF A VEHICLE

(71) Applicant: GM GLOBAL TECHNOLOGY OPERATIONS LLC, Detroit, MI (US)

(72) Inventors: Louise E. Stauffer, Bloomfield Hills, MI (US); Sandra N. Thomson, Bloomfield Hills, MI (US); Spencer W. Chamberlain, Sterling Heights, MI (US); Joseph Neighbors, Milford, MI (US); Mary E. Decaluwe, Oxford, MI (US); Jim K. Rainbolt, Haslett, MI (US); Paul W. Alexander, Ypsilanti, MI (US); David R. Fischer, Bloomfield Hills, MI (US); Joseph Bilderbeck, Rochester Hills, MI (US); Ann K. Duffy, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/414,453

(22) Filed: Jan. 24, 2017

(65) Prior Publication Data
US 2017/0210353 A1    Jul. 27, 2017

Related U.S. Application Data

(63) Continuation of application No. 15/414,417, filed on Jan. 24, 2017.

(60) Provisional application No. 62/287,421, filed on Jan. 26, 2016.

(51) Int. Cl.
*A47L 5/38* (2006.01)
*B60S 1/64* (2006.01)
*G05D 1/00* (2006.01)
*H04W 4/00* (2009.01)
*G07C 5/00* (2006.01)
*B60N 3/04* (2006.01)
*A47L 7/00* (2006.01)

(52) U.S. Cl.
CPC ............... *B60S 1/64* (2013.01); *A47L 7/0076* (2013.01); *B60N 3/048* (2013.01); *G05D 1/0088* (2013.01); *G07C 5/006* (2013.01); *H04W 4/005* (2013.01)

(58) Field of Classification Search
CPC .......... B60A 1/64; B60N 3/048; G07C 5/006; G05D 1/0088; H04W 4/005; A47L 7/0076
USPC ........................................................ 15/313
IPC .......................................................... A47L 5/38
See application file for complete search history.

(56) References Cited

U.S. PATENT DOCUMENTS

| | | | | |
|---|---|---|---|---|
| 3,284,836 A | * | 11/1966 | Ioppolo | B60N 3/044 15/215 |
| 8,663,782 B1 | * | 3/2014 | Siegel | A47G 27/0206 428/156 |
| 8,839,812 B2 | * | 9/2014 | Tanhehco | A61G 13/102 137/312 |
| 2009/0019662 A1 | * | 1/2009 | Yona | B60S 1/64 15/313 |

* cited by examiner

*Primary Examiner* — David Redding
(74) *Attorney, Agent, or Firm* — Lorenz & Kopf, LLP

(57) ABSTRACT

Methods and systems are provided for cleaning systems of a vehicle. In one embodiment, a system includes: a floor mat; a vacuum system integrated with the floor mat, the vacuum system comprising a port, one or more ducts, and one or more openings integrated with the floor mat; and a control module that selectively activates suction of the vacuum system based on a detection of a level of uncleanliness of the vehicle.

20 Claims, 8 Drawing Sheets

SYSTEMS AND METHODS FOR PROMOTING CLEANLINESS OF A VEHICLE

CROSS-REFERENCE TO RELATED APPLICATIONS

This application claims the benefit of U.S. provisional patent application Ser. No. 62/287,421, filed Jan. 26, 2016 which is hereby incorporated by reference in its entirety. This application is a continuation application of U.S. patent application Ser. No. 15/414,417 filed Jan. 24, 2016, which is hereby incorporated by reference in its entirety.

TECHNICAL FIELD

The technical field generally relates to vehicles, and more particularly relates to methods and systems for monitoring and maintaining a level of cleanliness of a vehicle.

BACKGROUND

An autonomous vehicle is a vehicle that is capable of sensing its environment and navigating with little or no user input. An autonomous vehicle perceives its environment using sensing devices such as radar, lidar, image sensors, etc. The autonomous vehicle system further uses information from global positioning systems (GPS) technology, navigation systems, other vehicles, infrastructure, and/or drive-by-wire systems to navigate the vehicle.

Application based transportation services are becoming increasingly popular. Conventional application based transportation services connect a user with a local driver who is available to take the user from point A to point B. The driver uses their own personal vehicle to transport the user. In some instances, it would be desirable to use autonomous vehicles instead of driver based vehicles for the transportation. In such instances, however, where a driver is not present in the vehicle, it would be difficult for the transportation service to monitor the cleanliness of the autonomous vehicle. Unclean vehicles are typically undesirable to a user.

Accordingly, it is desirable to provide methods and systems for monitoring and promoting cleanliness in an autonomous vehicle or any other type of vehicle. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for cleaning systems of a vehicle. In one embodiment, a system includes: a floor mat; a vacuum system integrated with the floor mat, the vacuum system comprising a port, one or more ducts, and one or more openings integrated with the floor mat; and a control module that selectively activates suction of the vacuum system based on a detection of a level of uncleanliness of the vehicle.

DESCRIPTION OF THE DRAWINGS

The exemplary embodiments will hereinafter be described in conjunction with the following drawing figures, wherein like numerals denote like elements, and wherein:

FIG. 2 is a functional block diagram of the cleanliness monitoring and remediation system in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
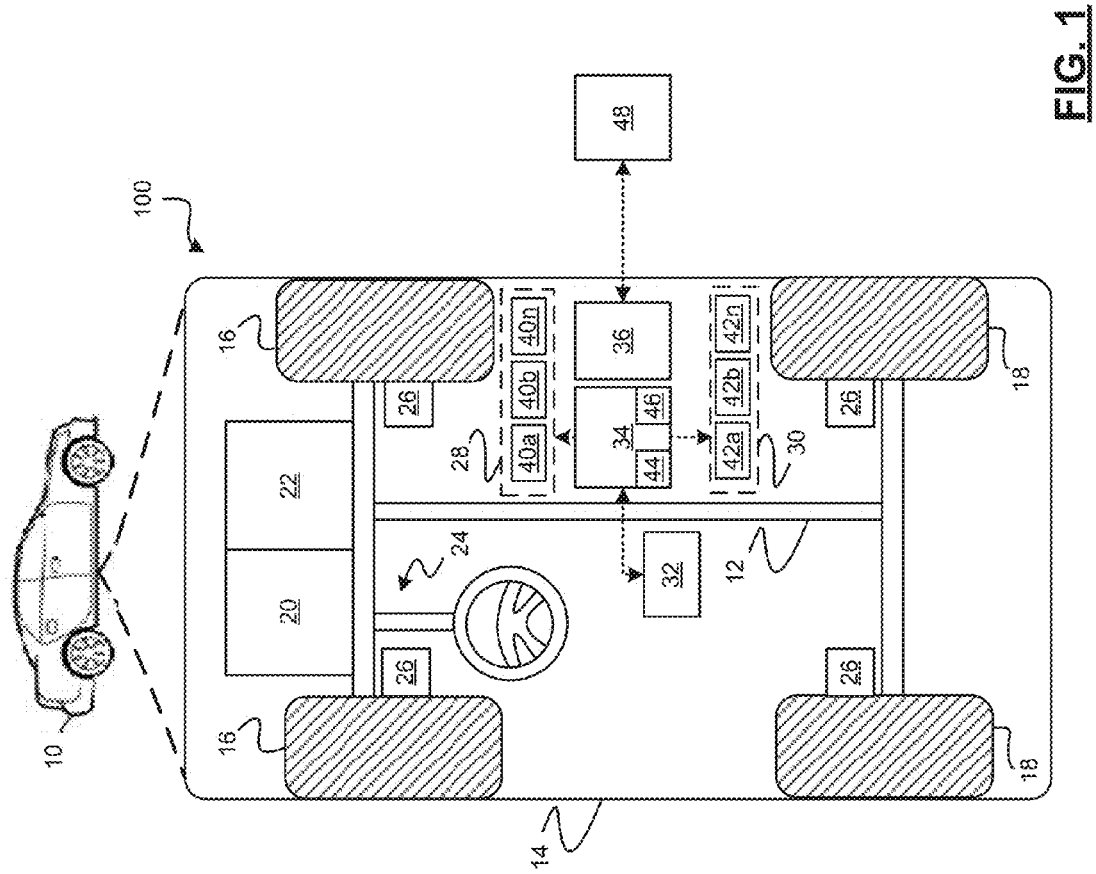
FIGS. 1 and 2 are functional block diagrams of an autonomous vehicle that includes a cleanliness monitoring and remediation system in accordance with various embodiments.

With reference to FIG. 1, a cleanliness monitoring and remediation system shown generally at 100 is associated with a vehicle 10 in accordance with various embodiments. In general, the cleanliness monitoring and remediation system 100 monitors the vehicle 10 for uncleanliness and controls one or more features of the vehicle 10 to remediate the uncleanliness.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the cleanliness monitoring and remediation system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, public transportation, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, the cleanliness monitoring and remediation system 100 disclosed herein can be implemented for any level of automation (or non-automated systems) and is not limited to the present examples.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, moisture sensors, temperature sensors, and/or other sensors disclosed herein. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 3:
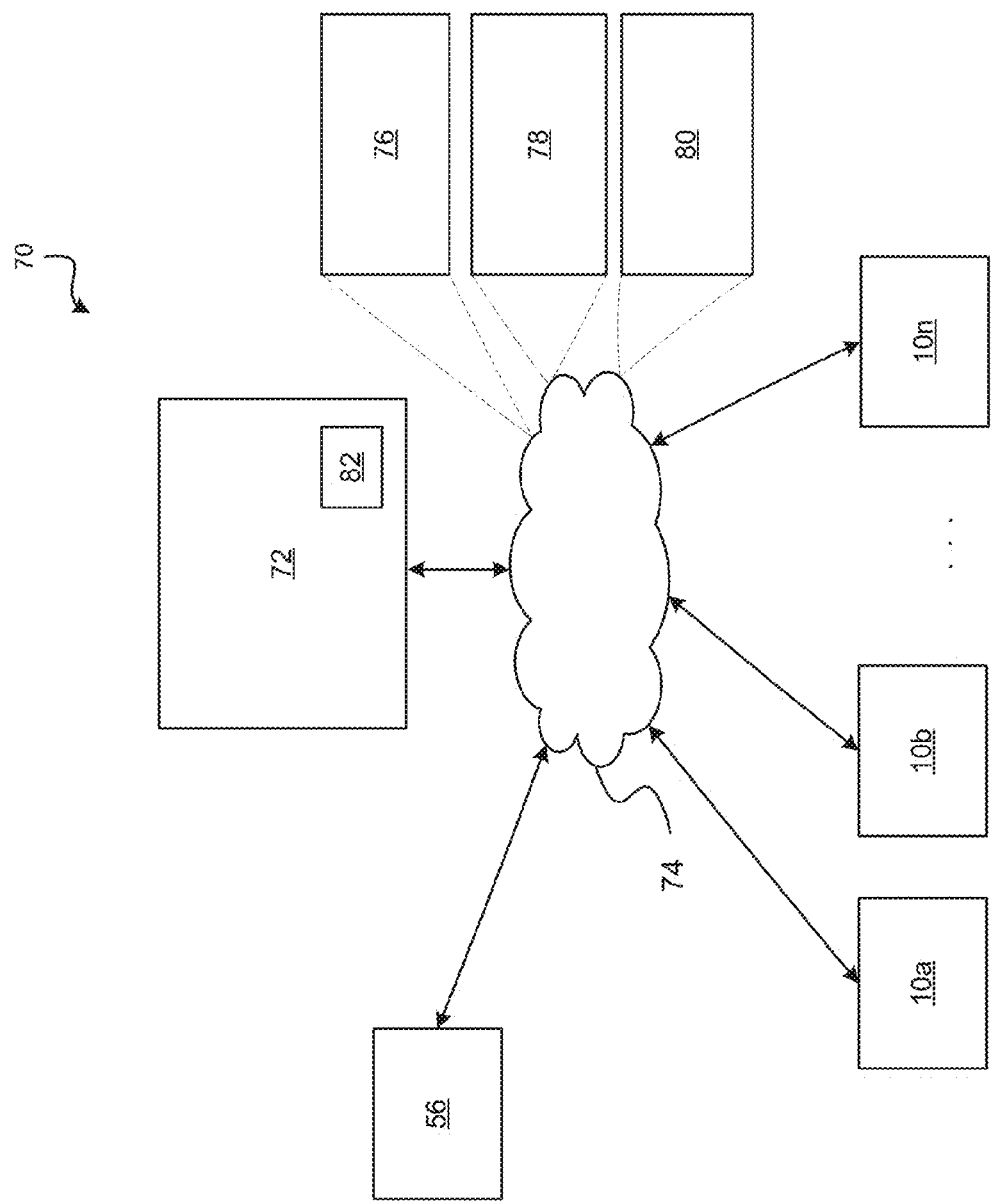
FIG. 3 is a transportation system that includes the autonomous vehicle shown in FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 3). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 3). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
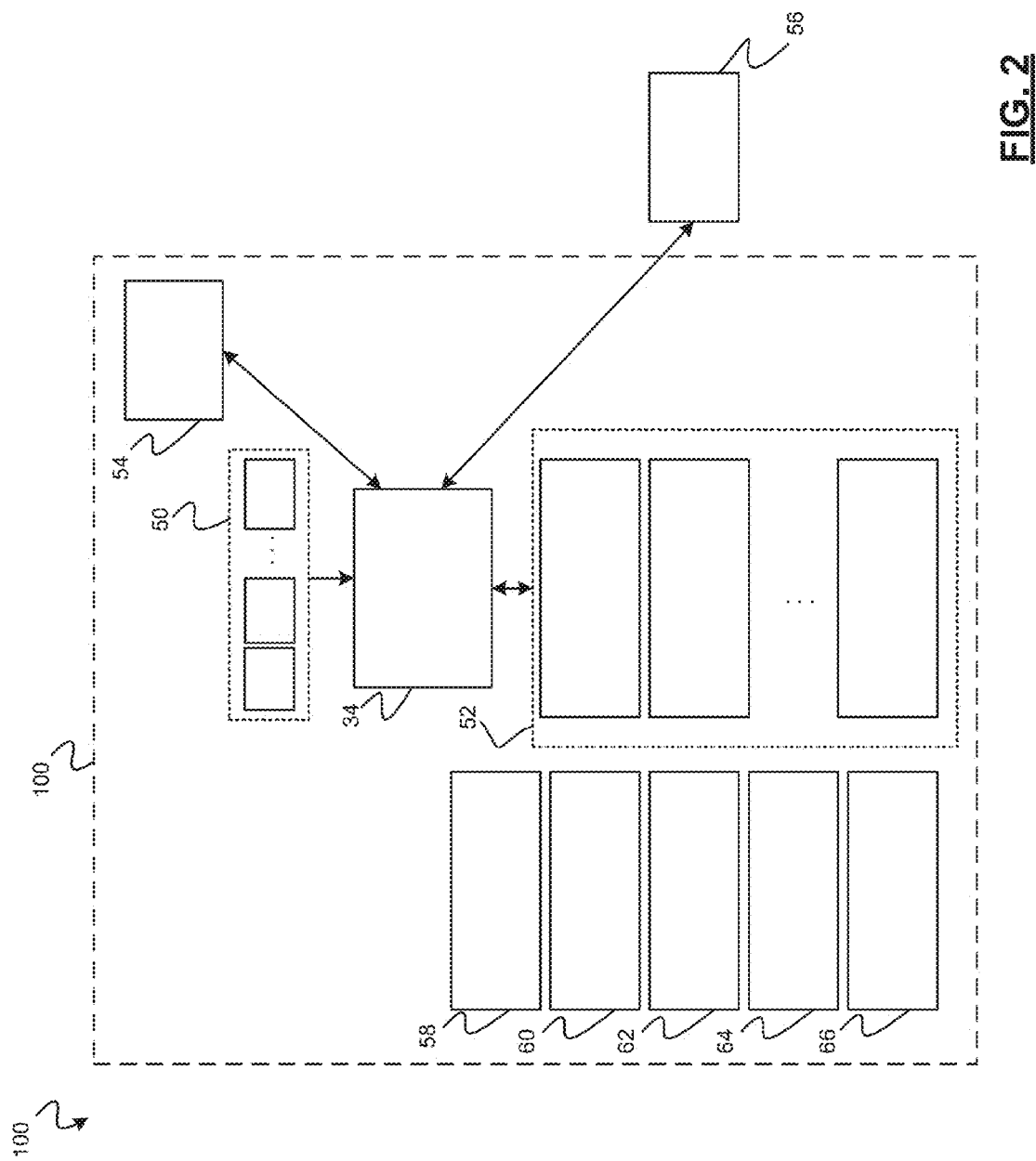

In various embodiments, as shown in FIG. 2, the cleanliness monitoring and remediation system 100 of the vehicle 10 includes cleanliness detection sensors 50 disposed in one or more locations of an interior of the vehicle 10, one or more cleaning elements 52 disposed in one or more locations of the interior of the vehicle 10, and one or more instructions embedded within the controller 34.

The cleanliness detection sensors 50 sense interior conditions for a presence, an amount, and/or an indication of the presence and/or an amount of certain particulates. The indication of or the actual presence and/or amount of the particulates can be used to indicate a level of cleanliness or uncleanliness within the vehicle 10. In various embodiments, the cleanliness detection sensors 50 directly sense the presence and/or amount of particulates. For example, the cleanliness detection sensors 50 can include at least one air quality sensor that senses a quality of the air within the vehicle 10 based on particulates within the air. In another example, the cleanliness detection sensors 50 can include at least one soil sensor that senses a soil or moisture level on a particular surface within the vehicle 10. In still another example, the cleanliness detection sensors 50 can include at least one element detection sensor that senses the presence of particular elements, such as, but not limited to, pet dander, peanuts, and other allergens in the air or on a surface. In still another example, the cleanliness detection sensors 50 can include at least one sensor for sensing microbes such as germs and/or viruses or body fluids that would be processed to infer illness contaminants. In still other examples, the cleanliness detection sensors 18 can include dirt, hair, odor, or other sensing fabrics.

In various embodiments, the cleanliness detection sensors 50 indirectly sense the presence and/or amount of particulates. For example, the cleanliness detection sensors 50 can include at least one image sensor that captures images that can be evaluated to detect the presence of trash, foreign objects, food, animals, or other particulate producing elements within the vehicle 10. In another example, the cleanliness detection sensors 50 can include at least one infrared optical sensors or other temperature based sensors that senses a temperature or humidity that can be evaluated to detect the presence of spills. As can be appreciated, the cleanliness detection sensors 50 described herein are merely exemplary as any number and any combination of cleanliness sensors combined with any number of particulate sensing algorithms can be included within the vehicle 10, in various embodiments.

In various embodiments, the cleaning elements 52 can include, but are not limited to, air vent systems that control the flow of ambient air to and from the interior of the vehicle 10; vacuum systems that use suction to remove debris from one area and collect the debris in a collection area (e.g., automatic vacuum systems, bots, or vac-mats that activate integral suction chambers when triggered, vacport systems on sidewalls with sloping floor or trenches to manage wet and dry messes, etc.); odor neutralizing systems; sweeper arm systems that move debris into a collection area; package systems that package the debris for containment, compaction, digestion and sealing for removal (e.g., a receptacle having at least one segmentable liner that is segmented and disposed in a primary trash reservoir at certain times, and that is segmented and fed into a temporary storage reservoir for analytically predicted scheduled or fullness detected removal); bots or arm systems that are configured to sort debris by size, type or any other feature or attribute and route the sorted debris for containment or processing; reverse static polarization systems that reverse the static polarization on surfaces to release dust, pet hair, and other elements; coordinated blower systems to direct debris or dust into collection or vacuum suction areas; and directional wave vibration systems that generate vibration or directional waves in areas of the vehicle (e.g., seat or trim panels) to loosen or move dirt, crumbs, or other elements into collection or vacuum suction areas.

In various embodiments, more intrusive cleaning elements 52 can include, but are not limited to, centrifugal suction systems where debris is released (e.g., statically or vibrated) and blown airborne then sucked into vacuum container; trash suction ports that automatically pull in trash that is placed in proximity to the port; localized air blowers or airflow routing ports to eliminate moisture or dirt from touch areas; infrared or ultraviolet disinfecting light systems directed to high-contact or microbial areas, system filters, or vents; steam cleaning systems that use engine heat or summer cabin heat to turn recovered water (e.g., rainwater, snow, condensation, etc.) into steam to treat high-touch or occupation areas through vents or surface micro-venting; active smart materials or nanomaterials to eliminate moisture or dirt from exterior or interior touch areas; micro-vibration systems that auto-clear or assist in easy removal of snow, ice, or dirt. As can be appreciated, the cleaning elements 52 described herein are merely exemplary as any number and any combination of cleaning elements 52 can be disposed throughout the vehicle 10, in various embodiments.

In various embodiments, the controller 34 is communicatively coupled (e.g., in a wired or wireless manner) to the cleanliness detection sensors 50. The controller 34 receives the sensor signals and determines a level of cleanliness of the vehicle 10. For example, the controller 34 compares values from the sensor signals to one or more baseline values to determine if the element or elements associated with the signal is clean or not clean and/or determines a level of cleanliness and/or uncleanliness. As can be appreciated, the controller 34 can be configured to determine the cleanliness/uncleanliness of any number of elements of the vehicle 10, the number being based on the number and particular arrangement of the cleanliness detection sensors 50. The controller 34 determines the cleanliness/uncleanliness at scheduled time intervals, based upon receipt of the certain sensor signals, based on a frequency of use of the vehicle 10, based on occupants and/or cargo scheduled to ride in the vehicle 10, and/or based upon certain environmental conditions such as wet/icy weather, smog, construction dust, etc.

In various embodiments, the controller 34 is communicatively coupled to one or more cleaning elements 52 of the vehicle 10. The controller 34 selectively generates control signals and/or messages to one or more of the cleaning elements 52 to operate the cleaning element(s) 52. For example, when uncleanliness or a certain level of cleanliness is determined, the controller 34 generates control signals and/or messages to a cleaning element 52 associated with the type and location of the uncleanliness to actuate cleaning. In another example, when cleanliness is determined, the controller 34 generates control signals and/or message to the cleaning element 52 associated with the previously determined uncleanliness to deactivate the cleaning.

In various embodiments, the controller 34 selectively generates the control signals and/or messages to the cleaning elements 52 based on a determined vehicle occupancy. The occupancy can be determined, for example, based on one or more in-vehicle sensors, information from the remote processing system, information from use logs or shared use logs, and/or information from the one more personal devices associated with one or more users. For example, when the controller 34 determines that the vehicle 10 is currently occupied by a user or occupied in a certain location of the vehicle 10, the controller 34 selectively delays the generation of the control signals and/or messages until it is determined that the vehicle 10 is unoccupied, that the certain occupant has moved to a different location, that some other trigger event has occurred. Alternatively, the controller 34 can selectively generate control signals and/or messages to certain cleaning elements 52 that are determined to be less intrusive to any of the determined occupants.

In various embodiments, the controller 34 generates notification signals and/or messages to notify the user of the cleanliness or uncleanliness. The notification signals may be communicated to the user through a notification system 54 such as an infotainment system or other notification system of the inside and/or outside of the vehicle 10. The notification may be visual, audio, and/or haptic. In addition, or alternative to the notification system 54 within the vehicle 10, the notification signals may be communicated to the user through a user device 56 associated with the user.

In various embodiments the notification signal may include a request for permission to initiate the cleaning. In such embodiments, the controller 34 generates the control signals and/or messages to actuate the cleaning elements 52 when a confirmation signal is received from the user through the notification system and/or personal device 56. Alternatively, the user may manually activate the cleaning elements 52 after receiving the notification signals and/or messages or independently based their own personal assessment of the cleanliness.

In various embodiments, the user may rate and/or report a cleanliness condition of the vehicle 10 using their user device 56. For example, the user device 56 may include an application or other feature that is configured to receive user input identifying a location, a type, and/or a level of cleanliness of the vehicle 10. (e.g., by point and capture, or selection of one or more selectable options, etc.). The application or feature is further configured to communicate the identified location, a type, and/or a level of uncleanliness of the vehicle 10 to the vehicle 10 and/or to a remote processing system (described with regard to FIG. 3).

As further shown in FIG. 1, in order to prevent uncleanliness of the vehicle 10, the vehicle 10 may be further equipped with one or more self-cleaning elements 58 (e.g., that do not require activation by the controller 34). In various embodiments, the self-cleaning elements 58 include, but are not limited to, dirt repellent elements, anti-smudge elements, antimicrobial elements, anti-static elements, nano-material elements, active materials elements, absorbent elements (e.g., floor mat or seat cushions with a super-absorbent polymer salts lower layer), hydrophobic elements that are integrated with certain vehicle structures (e.g., windows, door handles, door mats, seats, etc.).

In order to further prevent uncleanliness of the vehicle 10, in various embodiments, the vehicle 10 may further include no-touch operation elements 60 such as, but not limited to, doors, windows, lift gates and infotainment systems that are configured to be operated by, for example, an elbow, knee, speech, head gestures or other hands-free gestures. The operation may be configured by a user based on the user's preference. The user preferences' may be entered remotely in their own gesture language using their personal device or using a remote computer.

In order to further prevent uncleanliness of the vehicle 10, in various embodiments, the vehicle 10 may further include added structure 62, such as an air curtain or other structure to prevent or block blowing debris, snow, or rain from crossing into vehicle 10 through openings, or filters (e.g., HEPA or other type) that block allergens, ultraviolet rays, or other elements from entering.

In order to aid in the auto-cleaning of the vehicle 10, in various embodiments, the vehicle 10 can further be equipped with certain cleaning tools 64 that are accessible by a user through deliberate or natural action. For example, the cleaning tools 64 can include, but are not limited to, a towel roll with integral cleaning or disinfecting rotation for providing new seat covers or foot mats; a snow brush; an ice scraper; a shoe brush mounted strategically for quick clean naturally upon entry into the vehicle; a central vacuum with compressible hose with sufficient reach while seated in vehicle including connection ports to optimize seated cleaning ergonomics with doors closed or locked (safe on busy streets/city environments); and waste baskets or other elements that reline with a new bag or cover when an old bag or old cover is removed, where rewards (e.g., coupon incentives) or recognition can be given to encourage removal of the trash or bag.

In order to further aid in the auto-cleaning of the vehicle 10, in various embodiments, the vehicle 10 can include one or more removable elements 66. The removable elements 66 can be removed manually by a user or automatically by activation from the controller 34. The removable elements 66 can include a material or layer of a surface (e.g., seat surface, head rest surface, floor mat surface, etc.) or structure (e.g., cup holder, door handle, etc.). The removable elements 66 can be attached or removed, for example, by snaps or slides, tear-away, peel off, biodegradable, or any other form of removal. When the removable element 66 is removed, a new removable element may be exposed below the removable element or a new removable element may be installed.

With reference now to FIG. 3, in various embodiments, the autonomous vehicle 10 described with regard to FIGS. 1 and 2 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 3 illustrates an exemplary embodiment of an operating environment shown generally at 70 that includes an autonomous vehicle based remote transportation system 72 that is associated with one or more autonomous vehicles 10a-10n as described with regard to FIGS. 1 and 2. In various embodiments, the operating environment 70 further includes one or more personal devices 56 that communicate with the autonomous vehicle 10 and/or the remote transportation system 72 via a communication network 74.

The communication network 74 supports communication as needed between devices, systems, and components supported by the operating environment 70 (e.g., via tangible communication links and/or wireless communication links). For example, the communication network 74 can include a wireless carrier system 76 such as a cellular telephone system that includes a plurality of cell towers (not shown), one or more mobile switching centers (MSCs) (not shown), as well as any other networking components required to connect the wireless carrier system 76 with a land communications system. Each cell tower includes sending and receiving antennas and a base station, with the base stations from different cell towers being connected to the MSC either directly or via intermediary equipment such as a base station controller. The wireless carrier system 76 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 76. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 76, a second wireless carrier system in the form of a satellite communication system 80 can be included to provide unidirectional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station or other vehicles. The satellite telephony can be utilized either in addition to or in lieu of the wireless carrier system 76.

A land communication system 78 may further be included that is a conventional land-based telecommunications network connected to one or more landline telephones and connects the wireless carrier system 76 to the remote transportation system 72. For example, the land communication system 78 may include a public switched telephone network (PSTN) such as that used to provide hardwired telephony, packet-switched data communications, and the Internet infrastructure. One or more segments of the land communication system 78 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 72 need not be connected via the land communication system 78, but can include wireless telephony equipment so that it can communicate directly with a wireless network, such as the wireless carrier system 76.

Although only one user device 56 is shown in FIG. 3, embodiments of the operating environment 70 can support any number of user devices 56, including multiple user devices 56 owned, operated, or otherwise used by one person. Each user device 56 supported by the operating environment 70 may be implemented using any suitable hardware platform. In this regard, the user device 56 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 56 supported by the operating environment 70 is realized as a computer-implemented or computer-based device having the hardware, software, firmware, and/or processing logic needed to carry out the various techniques and methodologies described herein. For example, the user device 56 includes a microprocessor in the form of a programmable device that includes one or more instructions stored in an internal memory structure and applied to receive binary input to create binary output. In some embodiments, the user device 56 includes a GPS module capable of receiving GPS satellite signals and generating GPS coordinates based on those signals. In other embodiments, the user device 56 includes cellular communications functionality such that the device carries out voice and/or data communications over the communication network 74 using one or more cellular communications protocols, as are discussed herein. In various embodiments, the user device 56 includes a visual display, such as a touch-screen graphical display, or other display.

The remote transportation system 72 includes one or more backend server systems, which may be cloud-based, network-based, or resident at the particular campus or geographical location serviced by the remote transportation system 72. The remote transportation system 72 can be manned by a live advisor, or an automated advisor, or a combination of both. The remote transportation system 72 can communicate with the user devices 56 and the autonomous vehicles 10a-10n to schedule rides, dispatch autonomous vehicles 10a-10n, and the like. In various embodiments, the remote transportation system 72 stores account information such as subscriber authentication information, vehicle identifiers, profile records, behavioral patterns, and other pertinent subscriber information.

In accordance with a typical use case workflow, a registered user of the remote transportation system 72 can create a ride request via the user device 56. The ride request will typically indicate the passenger's desired pickup location (or current GPS location), the desired destination location (which may identify a predefined vehicle stop and/or a user-specified passenger destination), and a pickup time. The remote transportation system 72 receives the ride request, processes the request, and dispatches a selected one of the autonomous vehicles 10a-10n (when and if one is available) to pick up the passenger at the designated pickup location and at the appropriate time. The remote transportation system 72 can also generate and send a suitably configured confirmation message or notification to the user device 564, to let the passenger know that a vehicle is on the way.

In various embodiments, the vehicles 10a-10n and the remote transportation system 72 are further equipped to cooperate to ensure the cleanliness of the vehicles 10a-10n. For example, the vehicles 10a-10n can communicate the determined cleanliness and any other captured data (e.g., from the sensors, reported by the user, etc.) to the remote transportation system 72.

In various embodiments, the vehicles 10a-10n can communicate the cleanliness immediately upon determination of the cleanliness, at scheduled time intervals, or based on an occurrence of a predefined event (e.g., a proximity to a cleanliness remediation resource that is fixed or mobile). For example, the vehicles 10a-10n may communicate the cleanliness (whether clean or unclean) and any data associated therewith at scheduled intervals to the remote transportation system 72 for further processing. In another example, when the controller 34 (FIG. 2) determines that the vehicle 10a is not equipped to automatically remedy the uncleanliness or determines that the attempt to automatically remedy the uncleanliness failed, the vehicle 10a communicates the uncleanliness condition to the remote transportation system 72. As can be appreciated, the cleanliness and any data may be communicated in other situations in various embodiments.

The remote transportation system 72 includes a cleanliness processing module 82 that receives the cleanliness and/or data and determines an appropriate action. For example, the cleanliness processing module 82 can determine whether the cleanliness or uncleanliness requires immediate action, action but not immediate, or no action at all. If the cleanliness processing module 82 determines that the cleanliness or uncleanliness requires immediate action, the cleanliness processing module 82 can communicate an instruction to the vehicle 10a. The instruction can indicate to activate certain cleaning elements 22 (FIG. 2), to navigate the vehicle 10a to a closest maintenance location, and/or to take into consideration maintenance when scheduling a route.

In various embodiments, the cleanliness processing module 82 can generate signals and/or messages that are communicated to other future users of the vehicle 10a. For example, the signals and/or messages can be warning signals and/or messages that indicate that the vehicle 10a is due for cleaning and arrival time may be delayed, that the vehicle 10a currently contains certain elements (e.g., allergens) and they may want to select an alternative vehicle that is offered, for example, as a trade-off of time or configuration, etc. The signals and/or messages may be generated to user devices 56 or to a web application (not shown).

In various embodiments, the cleanliness processing module 82 can log the cleanliness and any received data associated therewith. The cleanliness processing module 82 processes the logged data to determine when a next maintenance cleaning should take place, to determine what cleaning procedures need to occur, and where and/or when to schedule the next maintenance cleaning. The cleanliness processing module 82 can report the logged data.

Figure 4:
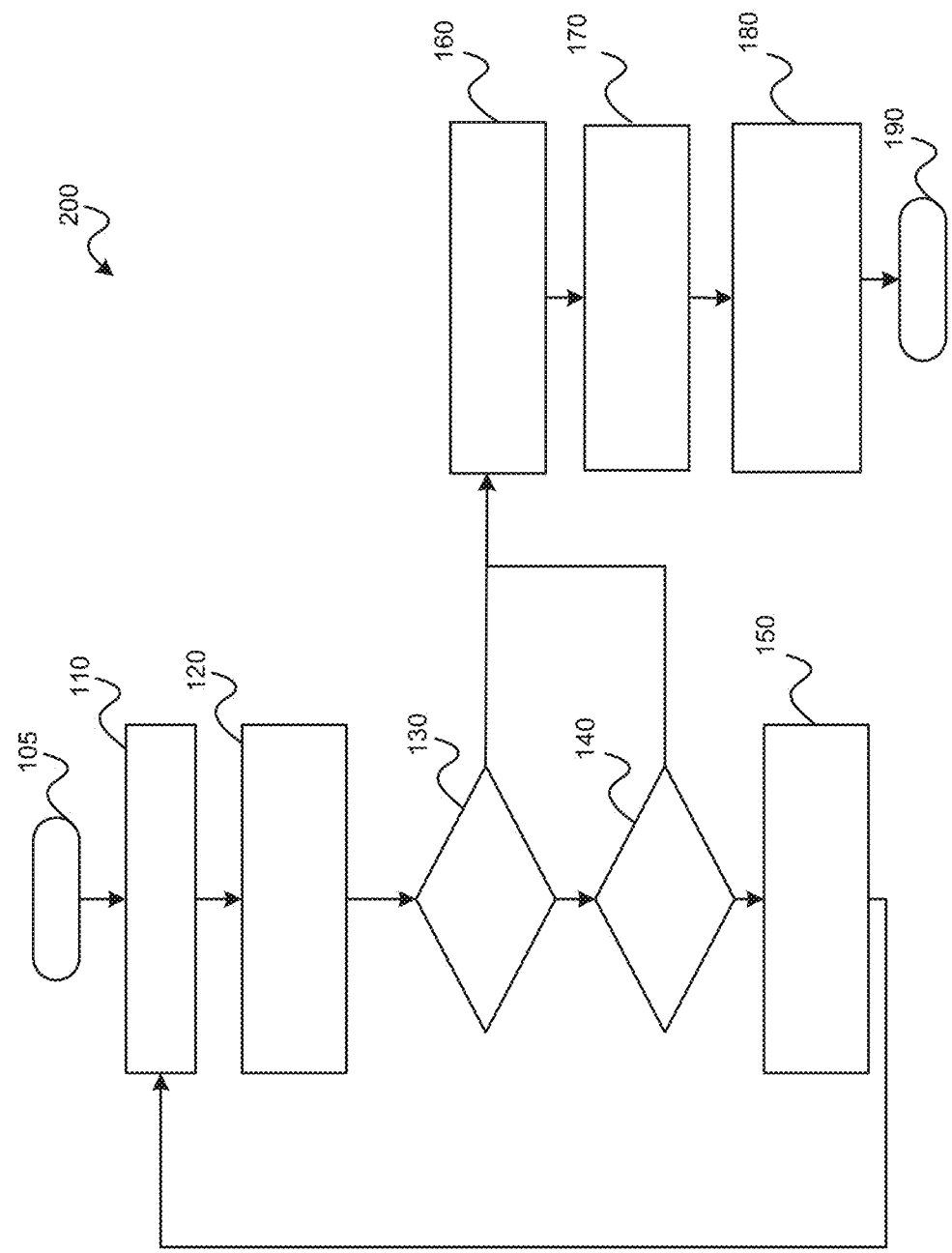
FIG. 4 is a flowchart that illustrates a cleanliness monitoring and remediation method in accordance with various embodiments.

With reference now to FIG. 4, a flowchart illustrates a cleanliness monitoring and remediation method 200 in accordance with exemplary embodiments. The method 200 can be utilized in connection with the vehicle 10 and remote transportation system 72 of FIGS. 1-3, in accordance with exemplary embodiments. As can be appreciated in light of the disclosure, the order of operation within the method is not limited to the sequential execution as illustrated in FIG. 4, but may be performed in one or more varying orders as applicable and in accordance with the present disclosure.

In various embodiments, the method may begin at 105. One or more cleaning sensor signals are received at 110. The cleaning sensor signals are processed to determine a cleanliness (or level of) at 120. The cleanliness is evaluated at 130 to determine if the cleanliness requires an action. If the cleanliness requires an action at 130, and the vehicle is equipped with the appropriate cleaning element to carry out the action at 140, control signals and/or messages are generated to operate the appropriate cleaning element at 150.

In various embodiments, the cleaning element is operated until it is determined that the element associated therewith is clean. For example, the method 200 continues at 110 where new sensor signals are received and processed at 120.

Once the level of cleanliness is such that no further action is required at 130, or if it is determined that the appropriate cleaning element is not present in the vehicle, any cleanliness and captured data is communicated to the remote transportation system 72 at 160.

Thereafter, the remote transportation system 72 processes the cleanliness and data to determine if an additional action is required. If additional action is required, the remote transportation system 72 communicates to the vehicle 10 and/or a user device 56 to coordinate the action at 180. Thereafter, the method may end at 190. As can be appreciated, other steps mentioned above may be performed by the cleanliness monitoring and remediation method 200, as the method is not limited to the present example.

With reference now to FIGS. 5-19, schematic diagrams illustrate an exemplary cleaning element 52 in more detail. The cleaning element 52 is a vacuum system 300 associated with a floor 302 of the vehicle 10. The vacuum system 300 generally includes a mat 202 (e.g., secured to a floor 204, unsecured to the floor 204, or integrally formed as part of the floor 204) of the vehicle 10 having at least one opening 206, a port 208, and one or more ducts 210. The port 208 couples at one end to a central suction system (not shown) and at another, opposite end to the one or more ducts 210.

Figure 5:
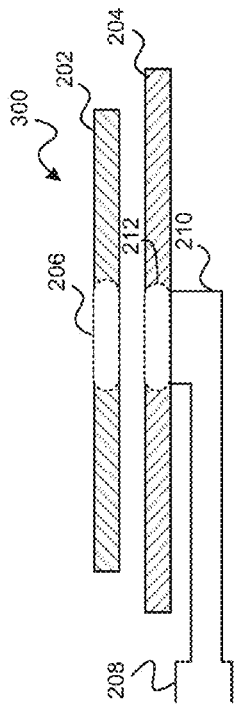
FIGS. 5-9 are schematic diagrams depicting a cross-sectional view of a vacuum system of the cleanliness monitoring and remediation system in accordance with various embodiments.

In various embodiments, as shown in FIG. 5, the ducts 210 are disposed between the floor 204 and the mat 202, for example, when the mat 202 is unsecured to the floor 204. The ducts 210 couple to the opening 206 of the mat 202. When activated, the central suction system provides suction through the port 208, the one or more ducts 210, and the opening 206.

Figure 6:
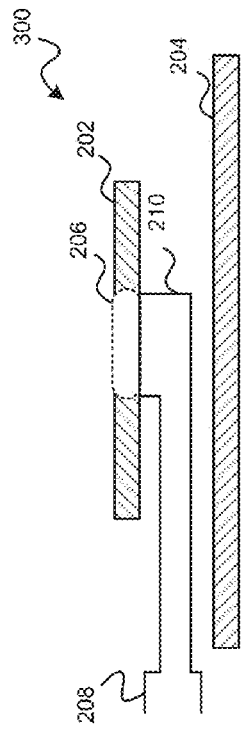

In various other embodiments, as shown in FIG. 6, the ducts 10 are disposed below the floor 204, for example, when the mat 202 is secured to the floor 204 or the mat 202 is the floor 204. The floor includes an opening 212 and the opening 206 is associated with an opening 212 in the floor 204. When activated, the central suction system provides suction through the port 284, the one or more ducts 210, the opening 212 in the floor 204, and the opening 206 in the mat 202.

Figure 7:
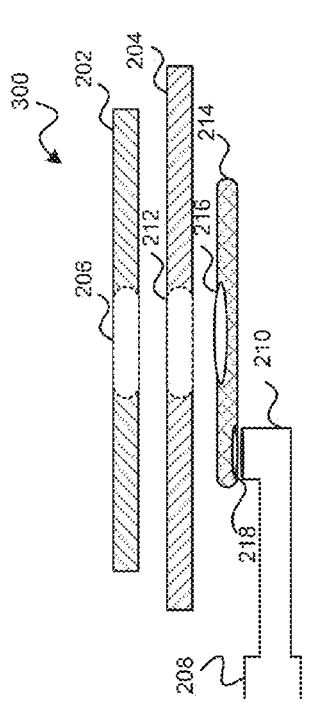
Figure 8:
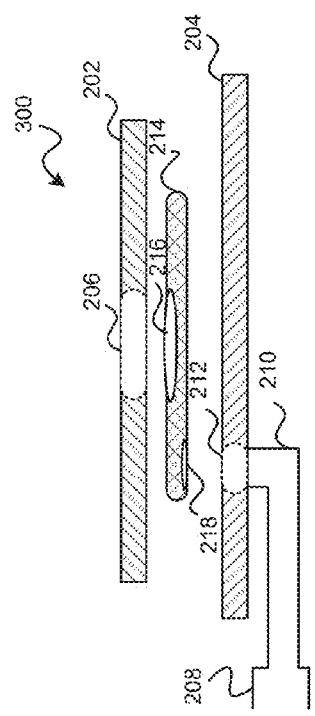
Figure 9:
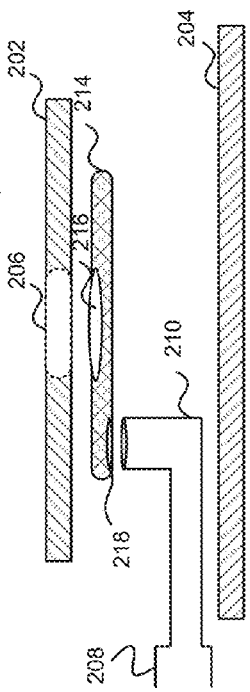

In various embodiments, as shown in FIGS. 7-9, the vacuum system 300 further includes a collection pan 214 having a plurality of openings 216, 218. In various embodiments, as shown in FIGS. 7 and 9, the collection pan 214 is disposed between the mat 202 and the floor 204. In FIG. 7, the ducts 210 are disposed below the floor 204 and the opening 218 corresponds to the opening 212 in the floor 204 and the opening 216 corresponds to the opening 206 in the mat 202. In various embodiments, as shown in FIG. 9, the ducts 210 are disposed between the floor 204 and the mat 202 and the opening 218 corresponds to the ducts 210 and the opening 216 corresponds to the opening 206 in the mat 202.

In various other embodiments, as shown in FIG. 8, the collection pan 214 is disposed below the floor 204. In various embodiments, the collection pan 214 may be associated with a channel system (not shown) that routes the debris to another separate container (bag or bin) that may be remotely located in the trunk or under one or several seats or in a console, or b-pillar areas. In FIG. 8, the opening 216 corresponds to the duct 210 and the opening 216 corresponds to the opening 206 in the mat 202.

As can be appreciated, the size, number, and/or shape of the openings 206, 212, 216, 218 can vary in various embodiments. For example, the mat 202 can include a plurality of openings 206 in various embodiments. In another example, the collection pan 214 can include a plurality of openings 216 in various embodiments.

Figure 11:
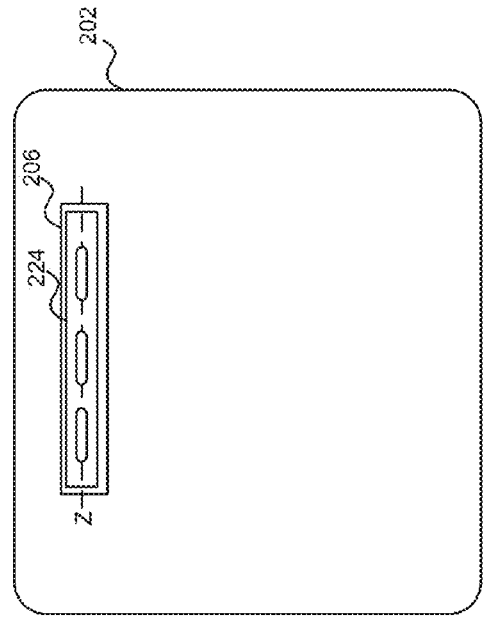
FIGS. 10-17 are schematic diagrams depicting a top perspective view of a floor mat of the vacuum system in accordance with various embodiments.
Figure 10:
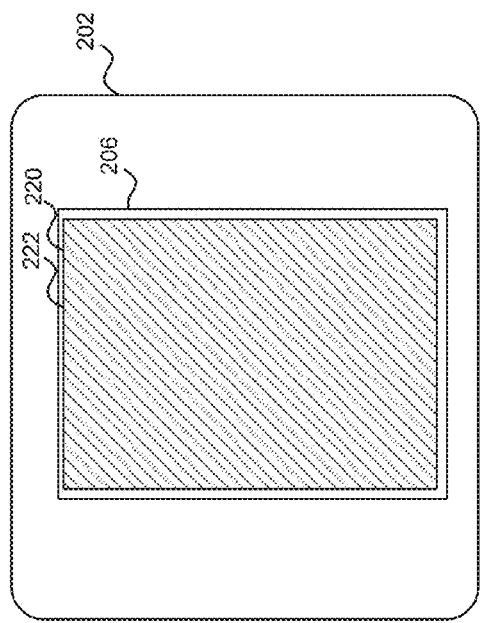
Figure 12:
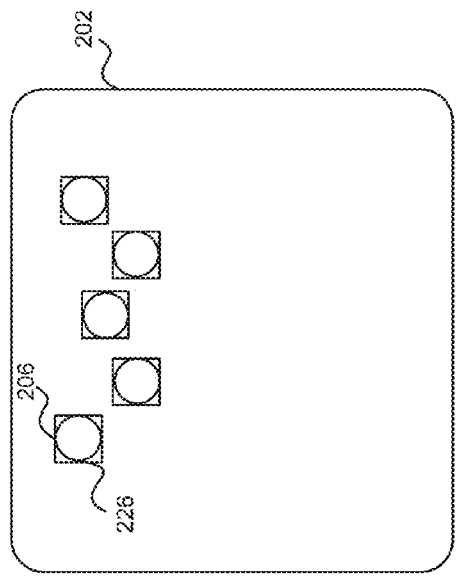

In various embodiments, as shown in FIGS. 10-12, the opening 206 of the mat 202 may be configured to include one or more features to increase suction while minimizing the loss of personal articles. For example, as shown in FIG. 10, the opening 206 can be configured to include a cover 220. The cover 220 can be integrally formed with, partially integrally formed with, or formed separate from and inserted into the opening 206 of mat 202. The cover 220 includes a plurality of openings 222 that are smaller than the opening 206, such as slits, apertures, or other smaller perforations. Suction flows through the smaller openings 222 pulling in smaller debris and preventing the larger debris to flow through.

In another example, as shown in FIG. 11, the opening 206 can be configured to include a rotatable element 224 (e.g., a cylinder, sphere, half sphere, etc.) that is manually or electrically rotatable around an axis Z. The rotatable element 224 includes a first side that includes slits, slots, apertures, or other smaller perforations and another side that is solid. When rotated to the first side, the suction flows through the smaller openings; and when rotated to the second side, the solid surface prevents objects from falling through the opening.

In still another example, the opening 206 can be configured to include a depressable element 226 (e.g., a sphere, half sphere, etc.). For example, the depressable element 226 may be spring loaded to a first position, and when in the first position closes or seals the opening 206 of the mat 202 thereby preventing suction to flow through. When the depressable element 226 is depressed to a second position, suction is activated and permitted to flow through the opening 206, along the sides of the depressable element 226.

As previously discussed, the mat 202 can include any number and any arrangement of openings 206. In various embodiments, the number and arrangement of the ducts 210 can correspond to the number and the arrangement of the openings 206. FIGS. 13-19 illustrate various arrangements of ducts 210 and openings 206. For example, in FIG. 14, openings having perforated channels 230*a*-230*c* are arranged around a perimeter of the floor mat 202 and a single duct 210*a* couples to one of the perforated channels 230*a*-230*c*. In another example, in FIG. 15, the openings having perforated channels 230*a*-230*c* are arranged around a perimeter of the floor mat 202 and auxiliary ducts 210*b*-210*d* extend from a primary duct 210*e* coupled to the port 208. The auxiliary ducts 210*b*-210*d* couple to a channel 230*a* at a first end, at substantially the middle, and at a second end. As can be appreciated, any number of auxiliary ducts can be implemented at any number of locations in various embodiments.

Figure 14:
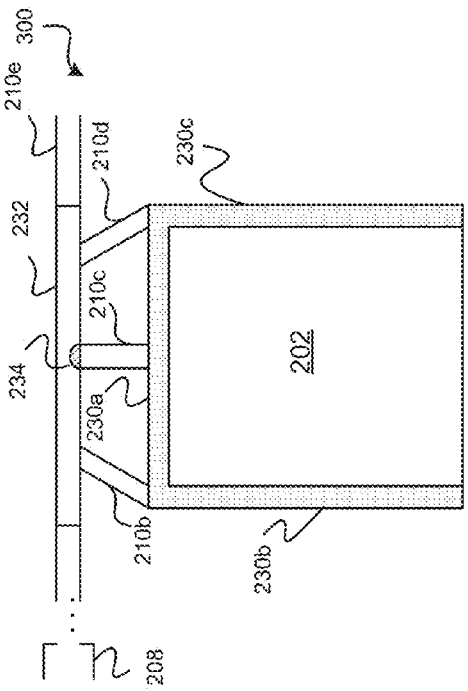
Figure 13:
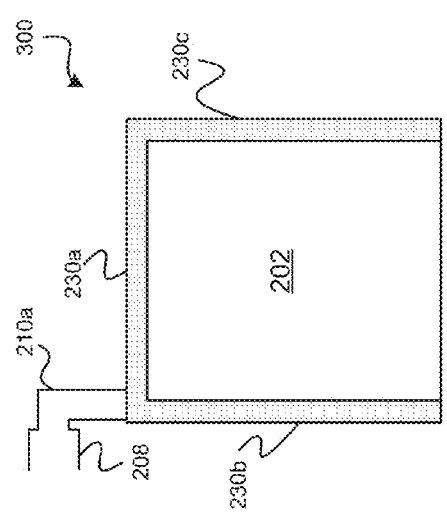

In various embodiments, the vacuum system 300 further includes a tube 232 that is slidable (mechanically or electrically) along the primary duct 210*e*. The tube 323 includes an opening 234 having a size and shape that corresponds to a size and shape of the auxiliary ducts 210*b*-210*d*. When slid to a first location, the opening 234 corresponds to the duct 210*b* permitting suction to flow through while other portions of the tube 234 close off suction to the ducts 210*c,* 210*d.* When slid to a second location, the opening 234 corresponds to the duct 210*c* permitting suction to flow through while other portions of the tube 232 close off suction to the ducts 210*b,* 210*d* (as shown in FIG. 14). When slid to a third location, the opening 234 corresponds to the duct 210*d* permitting suction to flow through while other portions of the tube 232 close off suction to the ducts 210*b,* 210*c*. As can be appreciated, the tube 232 may be slidable to any number of positions depending on the number and location of axillary ducts in various embodiments.

Figure 15:
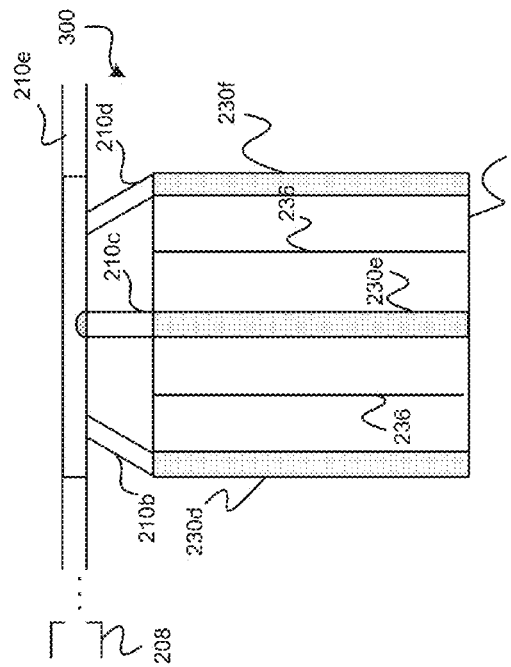

In another example, in FIG. 15, openings having perforated channels 230*d*-230*f* are arranged in parallel at a first end, at substantially a middle, and at a second end of the floor mat 202. As can be appreciated, any number of openings having perforated channels 230 can be implemented at any number of locations in various embodiments. Auxiliary ducts 210*b*-210*d* extend from the primary duct 210*e* coupled to the port 208. The auxiliary ducts 210*b*-210*d* couple to each of the channels 230*d*-230*f*.

In various embodiments, the vacuum system 300 further includes raised areas 236 of the floor mat 202. The raised areas 236 direct particulates towards the openings having perforated channels 230*d*-230*f*. As can be appreciated, any number of raised areas 236 can be implemented at any number of locations in various embodiments.

Figure 16:
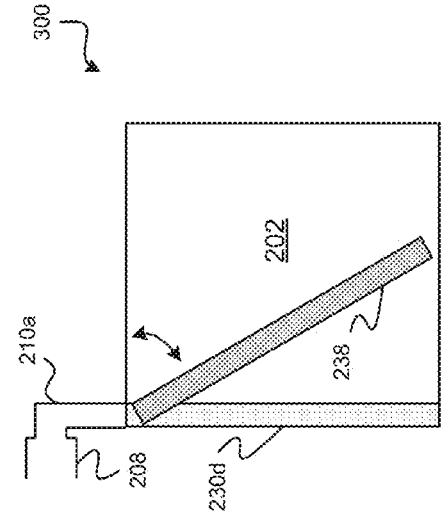

In still another example, in FIG. 16, the vacuum system 300 includes only the perforated channel 230*d* and a perforated rigid or flexible tube 238. The tube 238 may be used to sweep across (from a pivot point or translate along a rail system (not shown)) the floor mat 202 and to provide additional suction across the floor mat 202.

Figure 19:
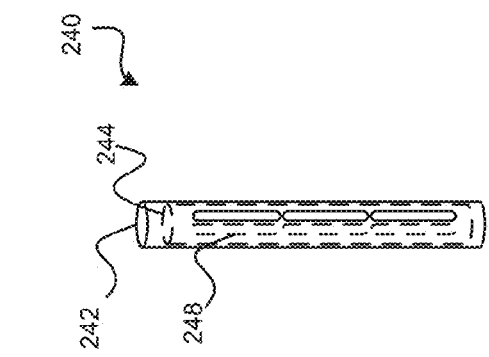
FIGS. 18 and 19 are schematic diagrams depicting a side perspective view of a manifold that is associated with the floor mat in accordance with various embodiments.
Figure 18:
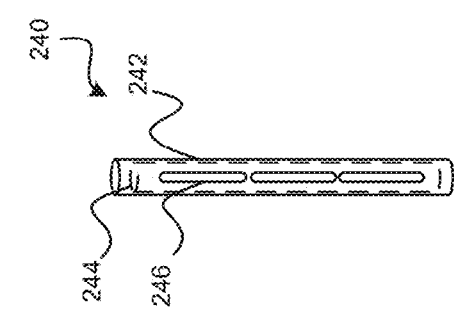
Figure 17:
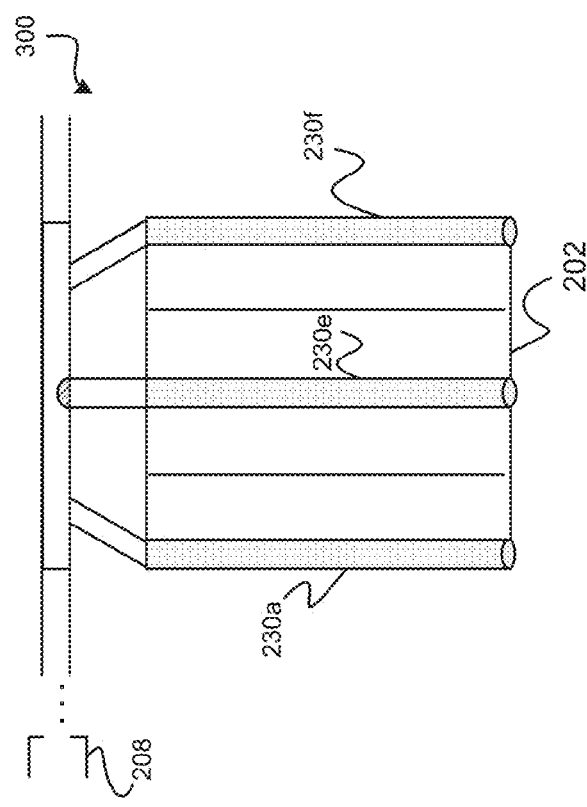

In still another example, as shown in FIGS. 9-11, one or more of the channels 230*d*-230*f* can include a manifold 240 (integrated therewith or removable) to increase vacuum efficiency and prevent loss of small objects. The manifold 240, in various embodiments, includes at least two concentric cylinders 242, 244 having slots 246. The slots 246 of the first cylinder 242 align with the slots 248 of the second cylinder 244 when the first cylinder 242 is in a first position and the second cylinder 244 is in a first position, thereby allowing for suction to flow through (as shown in FIG. 18). The slots 246 of the first cylinder 242 displace from the slots 248 of the second cylinder 244 when the first cylinder 242 is in the first position and the second cylinder 244 is slid or rotated to a second position, thereby preventing suction to flow through (as shown in FIG. 19).

As can be appreciated, the subject matter disclosed herein provides certain enhanced features and functionality to what may be considered as a standard or baseline autonomous vehicle 10 and/or an autonomous vehicle based remote transportation system 72. To this end, an autonomous vehicle and autonomous vehicle based remote transportation system or any other type of system can be modified, enhanced, or otherwise supplemented to provide the additional features described in detail herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cleaning system of a vehicle, comprising:
   a floor mat;
   a vacuum system integrated with the floor mat, the vacuum system comprising a port, one or more ducts, and one or more openings integrated with the floor mat; and
   a control module that selectively activates suction of the vacuum system based on a detection of a level of uncleanliness of the vehicle.

2. The cleaning system of claim 1, further comprising at least three openings and at least three perforated channels, wherein each perforated channel is associated with an opening of the at least three openings.

3. The cleaning system of claim 2, wherein the at least three perforated channels are arranged around a perimeter of the floor mat.

4. The cleaning system of claim 2, wherein the at least three perforated channels are arranged in parallel along the floor mat.

5. The cleaning system of claim 2, wherein a single duct couples to one of the at least three perforated channels.

6. The cleaning system of claim 2, further comprising at least three ducts, and wherein each duct of the at least three ducts couples to one perforated channel of the at least three perforated channels.

7. The cleaning system of claim 2, further comprising at least three ducts, and wherein the at least three ducts couple to one perforated channel of the at least three perforated channels.

8. The cleaning system of claim 2, further comprising a raised area associated with at least one of the at least three perforated channels.

9. The cleaning system of claim 6, further comprising a fourth duct that couples to each of the at least three ducts.

10. The cleaning system of claim 9, further comprising a tube having an opening, and wherein the tube is slidable along the fourth duct.

11. The cleaning system of claim 1, further comprising a perforated tube coupled to the at least one duct, wherein the tube is movable along the floor mat.

12. The cleaning system of claim 11, wherein the tube is rigid.

13. The cleaning system of claim 11, wherein the tube is flexible.

14. The cleaning system of claim 2, further comprising a manifold associated with the perforate channels.

15. The cleaning system of claim 14, wherein the manifold includes at least two cylinders, wherein each of the at least two cylinders includes a plurality of slots.

16. The cleaning system of claim 1, further comprising a cover having a plurality of openings, wherein the cover is associated with the opening of the floor mat.

17. The cleaning system of claim 1, further comprising a rotatable element including a first side with openings and a second side that is solid, wherein the rotatable element is associated with the opening of the floor mat.

18. The cleaning system of claim 1, further comprising a depressable element that is associated with the opening of the floor mat.

19. The cleaning system of claim 1, further comprising a collection pan disposed below the floor mat and having an opening that corresponds to the opening of the floor mat.

20. The cleaning system of claim 19, wherein the collection pan is further disposed below a floor of the vehicle.

* * * * *